(12) United States Patent
Snow et al.

(10) Patent No.: US 10,073,446 B1
(45) Date of Patent: Sep. 11, 2018

(54) MODULAR QUALITY CONTROL CENTER ASSEMBLY FOR TUBULARS

(71) Applicants: Daniel Wayne Snow, Andrews, TX (US); Chad Michael Snow, Andrews, TX (US)

(72) Inventors: Daniel Wayne Snow, Andrews, TX (US); Chad Michael Snow, Andrews, TX (US)

( * ) Notice: Subject to any disclaimer, the term of this patent is extended or adjusted under 35 U.S.C. 154(b) by 0 days.

(21) Appl. No.: 15/456,335

(22) Filed: Mar. 10, 2017

Related U.S. Application Data (60) Provisional application No. 62/342,114, filed on May 26, 2016.

(51) Int. Cl.
| | | |
|---|---|---|
| *B65G 47/46* | (2006.01) |
| *G05B 19/418* | (2006.01) |
| *E21B 19/15* | (2006.01) |
| *B65G 13/02* | (2006.01) |
| *B65G 47/88* | (2006.01) |
| *G01N 23/20* | (2018.01) |

(52) U.S. Cl.
CPC ....... *G05B 19/41875* (2013.01); *B65G 13/02* (2013.01); *B65G 47/8876* (2013.01); *E21B 19/15* (2013.01); *G01N 23/20* (2013.01); *B65G 2201/0276* (2013.01); *G05B 2219/32368* (2013.01)

(58) Field of Classification Search
CPC ................ B65G 13/02; B65G 47/8876; B65G 2201/0276; G05B 19/41875; G05B 2219/32368; G01N 23/20; E21B 19/15
USPC ...... 198/370.09, 371.3, 341.08, 341.09, 456, 198/571, 577; 700/219, 223, 228, 230; 414/746.4; 29/563
See application file for complete search history.

(56) References Cited

U.S. PATENT DOCUMENTS

| | | | | | |
|---|---|---|---|---|---|
| 3,458,055 | A | * | 7/1969 | Council | B65G 17/063 414/746.2 |
| 3,614,077 | A | * | 10/1971 | Blackburn | B23K 7/006 228/48 |
| 4,872,130 | A | * | 10/1989 | Pagano | G01N 29/0609 702/39 |

(Continued)

FOREIGN PATENT DOCUMENTS

FR 2529664 A1 * 1/1984 ........... G01B 15/025

*Primary Examiner* — Gene O Crawford
*Assistant Examiner* — Lester III Rushin
(74) *Attorney, Agent, or Firm* — Buskop Law Group, P.C.; Wendy Buskop (57) ABSTRACT

An automated modular quality control center assembly for tubulars having an automated inlet module, an automated transfer module, and an automated parameter defined segregation module. The automated inlet module has a pipe conveyor, which receives the tubulars from an initial pipe rack. The tubulars are rolled off the automated inlet module pipe conveyor to an automated transfer module pipe conveyor. The tubulars on the automated transfer module pipe conveyor pass in close proximity to and are scanned by the survey instrument detector. An automated pass fail pipe conveyor receives the tubulars from automated transfer module pipe conveyor. A pass test exit pipe rack or a fail test exit pipe rack receives the tubulars from the automated pass fail pipe conveyor that pass or fail a preset survey instrument limit of the survey instrument detector.

17 Claims, 5 Drawing Sheets

(56) References Cited

U.S. PATENT DOCUMENTS

| | | | | |
|---|---|---|---|---|
| 5,826,694 | A * | 10/1998 | Kim | G01B 5/0028 198/341.03 |
| 9,284,792 | B2 * | 3/2016 | Webre | E21B 17/026 |
| 2010/0224306 | A1 * | 9/2010 | Sutton | B29C 47/0023 156/64 |
| 2011/0106460 | A1 * | 5/2011 | Konopacki | G01M 99/00 702/43 |
| 2011/0138920 | A1 * | 6/2011 | Sauerland | G01B 11/0666 73/627 |
| 2013/0208850 | A1 * | 8/2013 | Schmitt | G01N 23/20 378/4 |
| 2015/0063972 | A1 * | 3/2015 | Girtman | B25J 9/0093 414/796.9 |

* cited by examiner

MODULAR QUALITY CONTROL CENTER ASSEMBLY FOR TUBULARS

CROSS REFERENCE TO RELATED APPLICATION

The present application claims priority to and the benefit of U.S. Provisional Application Ser. No. 62/342,114 filed on May 26, 2016 entitled "MODULAR QUALITY CONTROL CENTER ASSEMBLY FOR TUBULARS". This reference is hereby incorporated in its entirety.

FIELD

The present embodiments generally relate to a modular quality control center assembly for tubulars.

BACKGROUND

A need exists for a device for verifying that a pipe or other tubular is clean.

A further need exists for an automated system usable for quality control of pipe cleaning.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Determination of pipe and tubular condition and status is a must in many industries. For example, pipe that is removed from subsurface boreholes must be inspected to determine the condition of the pipe and whether it can be used for the service for which it was removed. Often times the serviceable condition of the pipe, which was removed from the borehole of a geologic geothermal oil and gas operation, may not be obvious to the visible eye. Other types of inspections may be necessary to determine whether the tubular can be returned to service in the same application as it was removed from or if it has another use if the condition of the inspection shows the pipe to be of a certain category of strength or functional use.

The API (American Petroleum Institute) has set a recommended list of parameters for standard inspection of oil gas and other mineral extractions and although this is not a complete list of points to check, it is the most widely used set of parameters. Some operators of these types of mineral extractions may impose their own additional set of parameters to complete an inspection of the tubulars for any given set of circumstances.

This device has the capability of utilizing these additional parameters pursuant to the operator's desire and performs a separation of these tubulars without having to manually handle the tubular as is often the case where API inspection facilities are conducting inspection operations. The manual manipulation of separating pipe in numbers is dangerous, and bears risk to the human in the form of crushing, pinching, and falling hazards. Additionally tubulars can be contaminated with hazardous substances in the form of chemicals and materials that are radioactive from being in close contact with the fluids and substances removed from the geologic or processing facilities where it was in use.

This apparatus will allow parameters through surveying techniques to be done remotely and safely with minimal manual manipulation. The traditional and additional parameters of inspections will prevent accidental death and prevent catastrophes, which can be the result of misuse or reuse of improperly inspected pipe or pipe that has been inspected in a manner that would not be considered complete for the purposes of an application for which it is to be further used.

Improperly inspected pipe has created or been the cause of numerous environmental leaks and spills. Improperly inspected tubulars often end up as scrap or construction material; and if still carrying the hazardous materials, these tubulars can cause bodily injury or death and increase risk to the human sphere associated in proximity to the unsuspecting public and especially those who are elderly or young. For example, conditions of tubulars that are radioactive can be set to parameters for protecting the human limits to exposure.

It is often found in certain oil and gas operations that radioactive scales are attached to the internal and external surfaces of the tubular body. These radioactive scales and depositions can be deadly to humans in chronic exposure if ingested or inhaled over a period of time. This apparatus will protect the personnel remotely operating the machinery and will limit their exposure to the material. It will also allow a separation of contaminated tubulars from those that are not contaminated allowing the return use of the tubulars to be placed into applications where the unsuspecting public would not expect to be exposed to these types of hazards.

The invention relates to an automated modular quality control center assembly for tubulars.

The automated modular quality control center assembly has an automated inlet module can have an initial pipe rack for tubulars and at least one pipe conveyor for receiving the tubulars from the initial pipe rack.

Each pipe conveyor can have a frame, a plurality of rollers connected across the frame supporting a tubular, a plurality of motors attached to the frame, each motor configured to rotate a roller, each motor connected to a power supply, a plurality of movable inclined stops mounted to the frame, a plurality of actuators mounted to the frame, each actuator operating a moveable inclined stop, wherein pairs of movable inclined stops individually index each tubular and convey each indexed tubular from the frame.

The automated modular quality control center assembly can have an automated transfer module connected to the automated inlet module. The automated transfer module can have at least one pipe conveyor for receiving the tubulars from the at least one pipe conveyor of the automated inlet module.

The automated modular quality control center assembly can have a survey instrument detector connected to the power supply. The survey instrument detector can be mounted proximate the pipe conveyor enabling each indexed tubular to pass in close proximity to the survey instrument detector for scanning.

The automated modular quality control center assembly can have a control module connected to the survey instrument detector, the power supply, each motor, and each actuator. The control module can be configured to control speed of each rollers to enable full scan to be performed by the survey instrument detector at a maximum speed.

The automated modular quality control center assembly can have an automated parameter defined segregation module 24 connected to the automated transfer module. The automated parameter defined segregation module can have at least one pipe conveyor for receiving the scanned tubulars from the automated transfer module and at least one post scan tubular pipe rack to receive only indexed and scanned tubulars that match a survey instrument preset limit.

In embodiments, the control module can have a master hydraulic pump in communication with a hydraulic reservoir, the master hydraulic pump fluidly connected to at least one of: the plurality of actuators and the plurality of motors for operating the motors and actuators hydraulically.

The control module can have a control processor in communication with a control data storage. The control processor can be configured to receive signals with data from the survey instrument detector, and compare received data to preset survey instrument limits in the control data storage to pass or fail tubulars as tubulars are moving past the survey instrument detector forming pass fail data that is stored in the control data storage.

In embodiments, the control module can have a master on/off device connected to the master hydraulic pump and the control processor.

The control module can have a variable speed hydraulic controller connected to the control processor, the master hydraulic pump, and to the plurality of rollers to change the speed that the tubulars are moving down the frame using the plurality of rollers.

The control module can have a display in communication with the control processor for presenting the pass fail data.

The control module can have a first controller in communication with the control processor for operating the plurality of movable inclined stops mounted on a first side of the frame based on preset survey instrument limits stored in the control data storage.

The control module can have a second controller in communication with the control processor for operating the plurality of movable inclined stops mounted on a second side of the frame opposite the first side based on preset survey instrument limits 198 stored in the control data storage.

In embodiments, the pipe racks of the automated parameter defined segregation module can have a pass test exit pipe rack to receive the tubulars from one of the pipe conveyors that passes a preset limit of the survey instrument detector and a fail test exit pipe rack to receive the tubulars from one of the pipe conveyors that do not pass the preset survey instrument limit of the survey instrument detector.

In embodiments, the control module is connected to a network for communication with a client device for remote control of the modular quality control center.

The control data storage includes preset pipe conveyor inlet speeds, preset pipe conveyor detection speeds, and preset survey instrument detector settings.

In embodiments, the control data storage can have computer instructions configured to instruct the control processor to receive survey instrument signals and compare received survey instrument signals to the preset survey instrument limits.

The control data storage can have computer instructions configured to instruct the control processor to stop or progress tubular movement using the plurality of movable inclined stops depending on whether a scanned tubular fails or meets the preset survey instrument limits, The control data storage can have computer instructions configured to instruct the control processor to compute a quantity of tubulars that meet and fail the preset survey limits by unit of time.

The control data storage can have computer instructions to instruct the control processor to receive signals from a client device to change preset survey instrument detector settings.

In embodiments, the network can have at least one of: a cellular network, a local area network, a SCADA network, a wide area network, a microwave network, a satellite network, a fiber optic network or combinations thereof.

The automated transfer module can include a reject pipe rack connected to one of the pipe conveyors of the automated transfer module, wherein the control data storage can include computer instructions configured to instruct the control processor to accept or reject the individual tubular when an operator identifies a visual defect in the tubular.

In embodiments, the power supply can include an onboard power supply mounted in the control module with a capacity of from 50 bolts to 480 volts of three-phase current.

The variable speed hydraulic controller can be configured to move the tubulars longitudinally on the frame at a rate from 0.1 feet per minute to 60 feet per minute.

In embodiments, the survey instrument detector is at least one of: a gamma ray detector, a beta particle detector, and an alpha particle detector.

The survey instrument detector can be at least one of a laser, ultrasonic detector for an electromagnetic detect or a foreign material differentiator.

In embodiments, the gamma ray detector transmits signals to the control processor and the control processor uses computer instructions in the control data storage to calculate detected radiation and presents a signal from at least 1 micro Roentgen and up to 500 micro Roentgens on the display.

In embodiments, the control module can include a hydraulic pump actuation switch connected to the control processor, an emergency stop 132 connected to the control processor, a forward and reverse switch for each pipe conveyor of the automated inlet module, each pipe conveyor connected to the control processor, and a load auto up and load auto down switch connected to the control processor for operating the movable inclined stops.

Eight movable inclined stops can be connected to the frame with four movable inclined stops mounted on one side of the frame and four movable inclined stops mounted on an opposite side of the frame.

In embodiments, the motors can be pneumatic motors, hydraulic motors, or combinations thereof.

In embodiments, the actuators are pneumatic actuators, hydraulic actuators, or combinations thereof.

In embodiments, an automated modular quality control center assembly for tubulars can include an automated inlet module.

The automated inlet module can have an initial pipe rack holding the tubulars and at least one pipe conveyor for receiving the tubulars from the initial pipe rack.

Each pipe conveyor can include a frame, a plurality of rollers connected across the frame, a plurality of motors, a plurality of movable inclined stops mounted to the frame to enable indexing of individual tubulars, and a plurality of actuators mounted to the frame connected to one of the moveable inclined stops.

Each motor can be secured to one of the rollers and to the frame 30, each motor connected to a power supply.

The automated modular quality control center assembly for tubulars can include a survey instrument detector connected to the power supply and mounted proximate the frame configured to scan each tubular as the tubular moves on one of the pipe conveyor.

The automated modular quality control center assembly for tubulars can include a control module connected to the survey instrument detector and to (i) the power supply, (ii) each motor, and (iii) each actuator.

The automated modular quality control center assembly for tubulars can include an automated parameter defined segregation module removably connected to an automated transfer module.

In embodiments, the automated parameter defined segregation module can include at least one pipe conveyor for receiving the tubulars from the automated transfer module, a pass test exit pipe rack to receive the tubulars from the automated transfer module that are within a preset survey instrument limit of the survey instrument detector, and a fail test exit pipe rack to receive the tubulars from the automated transfer module that are outside the preset survey instrument limit of the survey instrument detector.

In embodiments, the control module can have a master hydraulic pump in communication with a hydraulic reservoir.

The master hydraulic pump can be fluidly connected to at least one of: the plurality of actuators and the plurality of motors for operating the motors and actuators hydraulically.

The control module can have a control processor in communication with a control data storage, the control processor configured to receive signals with data from the survey instrument detector and compare received data to preset survey instrument limits in the control data storage to pass or fail tubulars as tubulars are moving past the survey instrument detector forming pass fail data that is stored in the control data storage.

The control module can have a master on/off device connected to the master hydraulic pump and the control processor.

The control module can have a variable speed hydraulic controller connected to the control processor, the master hydraulic pump, and to the plurality of rollers to change the speed that the tubulars are moving down the frame using the plurality of rollers.

The control module can have a display in communication with the control processor for presenting the pass fail data.

The control module can have a first controller in communication with the control processor for operating the plurality of movable inclined stops mounted on a first side of the frame based on preset survey instrument limits stored in the control data storage.

The control module can have a second controller in communication with the control processor for operating the plurality of movable inclined stops mounted on a second side of the frame opposite the first side based on preset survey instrument limits stored in the control data storage.

An automated modular quality control center assembly for tubulars can include an automated transfer module connected to the automated inlet module.

The automated transfer module can include at least one pipe conveyor for receiving tubulars.

The automated modular quality control center assembly for tubulars can include a survey instrument detector connected to the power supply.

In embodiments, the survey instrument detector can be mounted proximate the frame enabling each tubular on the at least one pipe conveyor to be scanned by the survey instrument detector.

The automated modular quality control center assembly for tubulars can include a control module connected to (i) the survey instrument detector, (ii) the power supply, (iii) each motor, and (iv) each actuator.

The automated modular quality control center assembly for tubulars can include an automated parameter defined segregation module connected to the automated transfer module, the automated parameter defined segregation module comprising: at least one pipe conveyor for receiving the tubulars from the automated transfer module.

The automated modular quality control center assembly for tubulars can include at least one post scan tubular pipe rack to receive scanned tubulars that match a survey instrument preset limit.

The invention relates to an automated modular quality control center assembly for tubulars.

In embodiments, the automated modular quality control center assembly for tubulars can have an automated inlet module. The automated inlet module can have an initial pipe rack holding a plurality of tubulars.

Also, the automated inlet module can have at least one inlet module pipe conveyor for receiving tubulars from the initial pipe rack. The inlet module pipe conveyor pipe conveyor can have a frame such as a rectangular frame.

In embodiments, the inlet module pipe conveyor can have a plurality of rollers connected across the frame and a plurality of motor, wherein each motor can be secured to each roller and to the frame. Further, each motor can be connected to a power supply.

In embodiments, the inlet module pipe conveyor can have a plurality of actuators mounted to the frame.

In embodiments, the inlet module pipe conveyor can have a plurality of movable inclined stops mounted to the frame. Each movable inclined stop can be connected to each actuator. Also, each movable inclined stop can be mounted between two rollers. Pairs of movable inclined stops can be positioned offset from each other on the frame.

In embodiments, the plurality of movable inclined stops can be configured to either stop movement of tubulars or progress movement of tubulars. The plurality of movable inclined stops can move away from the frame to raise an individual tubular and roll the individual tubular off the inlet module pipe conveyor.

In embodiments, an automated transfer module can be connected to an automated inlet module. The automated transfer module can have at least one automated transfer module pipe conveyor for receiving tubulars from the inlet module pipe conveyor and a survey instrument detector can be connected to the power supply. The survey instrument detector can be mounted proximate the frame enabling a tubular on the pipe conveyor to pass in close proximity to the survey instrument detector for scanning by the survey instrument detector.

In embodiments, the automated transfer module can have a control module connected to the survey instrument detector and the power supply, each motor, and each actuator. The control module can have a master hydraulic pump in the control module in communication with a hydraulic reservoir, the master hydraulic pump fluidly connected to at least one of: the actuators and the motors.

The control module can have a control processor such as a computer. The control processor can be in communication with a control data storage. The control processor can be configured to receive data from the survey instrument and compare received data to known standards in the data storage to pass or fail tubulars scanned by the survey instrument detector forming compared data.

The following terms are used herein:

The term "actuator" as used herein refers to air, electrical, mechanical, magnetic, hydraulic devices that are mounted to the frame of the pipe conveyor and are capable of performing work of sufficient capacity to separate the indexed tubulars of the pipe conveyor.

The term "automated inlet module" refers to an initial pipe rack connected to segmenting or sorting a pipe conveyor with individual tubular indexing capability.

The term "automated parameter defined segregation module" refers to at least one pipe rack, or two pipe racks connected in series, or multiple pipe racks connected in series, that contains sorted pipe based on the parameters of the survey instrument detector.

The term "automated transfer module" refers to an assembly connected in series to an automated inlet module. Each automated transfer module has at least one pipe conveyor and a pipe rack that has indexed tubulars. In embodiments automated transfer modules also have a survey instrument and control module connected to them for measuring tubulars that have been indexed in the automated inlet module.

The term "control module" refers to a unit that can be connected to an automated inlet module, or the automated transfer module, or the automated parameter defined segregation module for providing interface between the survey parameters used by the survey and the electromechanical segments of the automated inlet, transfer and parameter defined segregation modules. The control module has a control processor and a control data storage. The processor can be at least one of: a programmable logic controller and a processor of a computer.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "motor" refers to a device that converts rotational angular velocity to linear velocity or motion at speeds from 0.1 feet per minute to 300 feet per minute. The motors can be variable speed. Hydraulic motors can be used or a DC or AC motor. The motors can be capable of a horsepower rating which enable mass transfer of the predefined diameters and weight per foot of the tubulars.

The term "movable inclined stops" refers to actuatable stops that move perpendicular to the longitudinal direction of the tubular as the tubular moves on the pipe conveyor. The stops are configured to raise the tubular to a height sufficient to transfer the tubular to a receiving pipe rack in any direction.

The term "operator" can refer to a human, or to a computer with a camera for providing visual scanning of tubular, and computer instructions that enable the computer with camera to compare the visual information to stored visual information limits for tubulars.

The term "pipe conveyor" refers to at least one pipe conveyor for conveying multiple tubular sequentially and automatically. The pipe conveyor can change the speed in conveyance from very slow to a survey speed at maximum linear velocity. For example, the rate can range from 0.1 feet per minute to 300 feet per minute for tubulars with diameters between 1 inch and 4.5 inches, and a length between 15 feet and 35 feet. In embodiments, a frame, a plurality of rollers connected across the frame, a plurality of motors, a plurality of actuators mounted to the frame, and a plurality of movable inclined stops mounted to the frame; wherein pairs of movable inclined stops of the plurality of movable inclined stops are positioned offset from each other on the frame and configured to raise and roll an individual tubular of the tubulars off the at least one pipe conveyor.

The term "power supply" refers to an onboard power source, such as an uninterruptible power supply containing batteries, or a connection to a power grid. The power supply can be 5 volt DC to 480 volt AC with 50-60 Hz.

The term "roller" as used herein refers to devices connected to the motors, which are constructed in a fashion to allow self-centering of each tubular as the tubular progresses in a linear fashion down the pipe conveyor. The invention requires sufficient rollers to not only support the full weight of each tubular without deformation but also provide linear translational motion requirements of the pipeline. In embodiments, at least two rollers are used, wherein each roller is cradling the tubular.

The term "survey instrument detector" refers to a scanning device that scans for a variety of physical attributes for example, visual defects, such as surface pitting, thread wear, dents, longitudinal cracks, longitudinal eccentricity of the tubular. In embodiments the survey instrument detector can be a radiation detector such as a gamma ray detector, a beta particle detector, and an alpha particle detector. In embodiments, the survey instrument detector can be at least one of a laser, ultrasonic detector for an electromagnetic detect or a foreign material differentiator.

The term "tubular" refers a pipe joint, casing, drill string.

In embodiments, the control module can have a master on/off device connected to the master hydraulic pump and the control processor. A variable speed hydraulic controller can be connected to the control processor, the master hydraulic pump and to the plurality of rollers to change the speed of a tubular on the plurality of rollers.

The control module can have a display in communication with the control processor for presenting the compared data.

In embodiments, the control module can have both a first controller in communication with the control processor for operating all movable inclined stops mounted on a first side of the frame based on a set of rules for pass/fail stored in the control data storage, and a second controller in communication with the control processor for operating all movable inclined stops on a second side of the frame opposite the first side of the frame based on the set of rules for pass/fail stored in the control data storage.

In embodiments, an automated parameter defined segregation module can be connected to the automated transfer module. The automated pass fail conveyor module can have at least one automated parameter defined segregation module pipe conveyor for receiving tubulars from the automated transfer module pipe conveyor. A pass test exit pipe rack can receive tubulars from the pipe conveyor that pass a preset survey instrument limit of the survey instrument detector, and a fail test exit pipe rack can receive tubulars from the pipe conveyor that do not pass a preset survey instrument limit of the survey instrument detector.

Figure 1A:
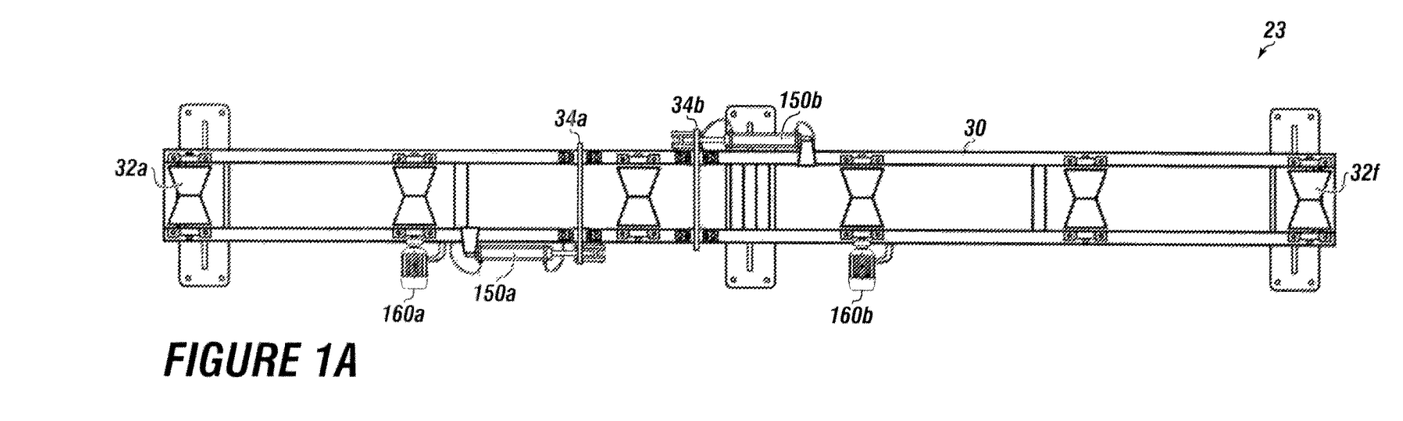
FIGS. 1A-1B depict a portion of the automated modular quality control center assembly for tubulars according to one or more embodiments.
Figure 1B:
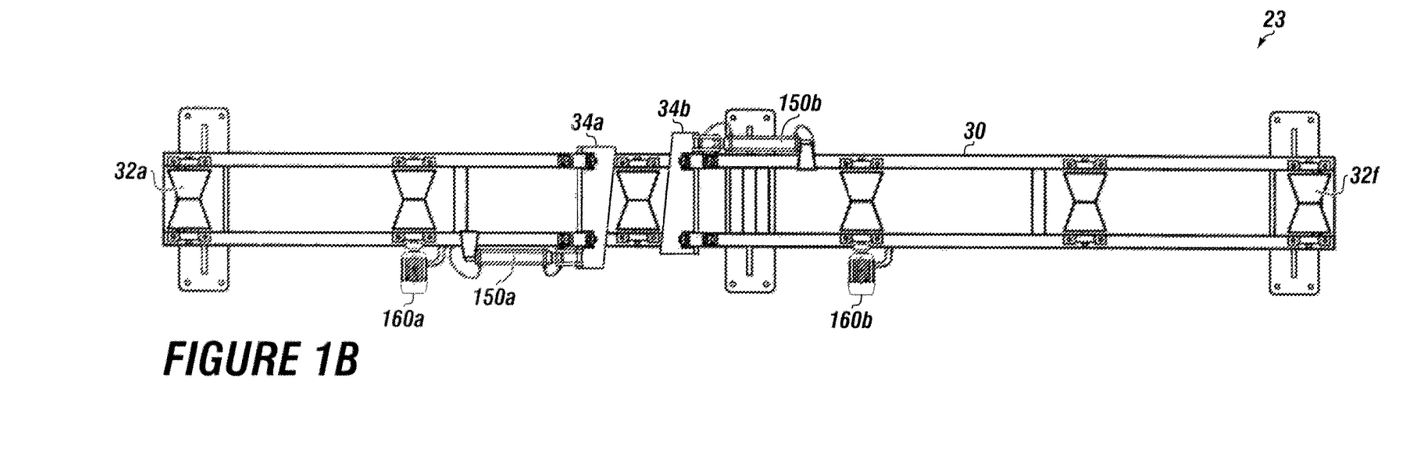

Turning now to the Figures, FIGS. 1A-1B depict a portion of the automated modular quality control center assembly for tubulars according to one or more embodiments.

A portion of the automated modular quality control center assembly for tubulars, wherein the portion as used herein can be referred to as a pipe conveyor 23.

The pipe conveyor can have a frame 30 with a plurality of rollers 32a-32f, which can be connected across the frame 30.

In embodiments, the pipe conveyor 23 can have a plurality of motors 160a and 160b. Each motor 160a and 160b can be secured to one of the plurality of rollers 32a-32f and to the frame 30. Each motor 160a and 160b can be connected to a power supply. The plurality of motors 160a and 160b can be pneumatic motors, hydraulic motors, or combinations thereof.

In embodiments, the pipe conveyor 23 can have a plurality of actuators 150a and 150b, which can be mounted to the frame 30. The plurality of actuators 150a and 150b can be pneumatic actuators, hydraulic actuators, or combinations thereof.

Also, a plurality of movable inclined stops 34a and 34b can be mounted to the frame 30. Each movable inclined stop 34a and 34b can be connected to at least one of the actuators 150a and 150b.

In embodiments, each movable inclined stop 34a and 34b can be mounted between two rollers of the plurality of rollers 32a-32f. In embodiments, pairs of movable inclined stops can be positioned offset from each other on the frame.

In embodiments, each of the plurality of movable inclined stops 34a and 34b can be configured to either stop movement of tubulars or progress movement of tubulars. In addition, when the plurality of movable inclined stops 34a and 34b are raised individual tubulars can roll off the pipe conveyor.

In embodiments, eight movable inclined stops can be connected to the frame with four movable inclined stops mounted on one side of the frame 30 and four movable inclined stops mounted on an opposite side of the frame 30.

Figure 2A:
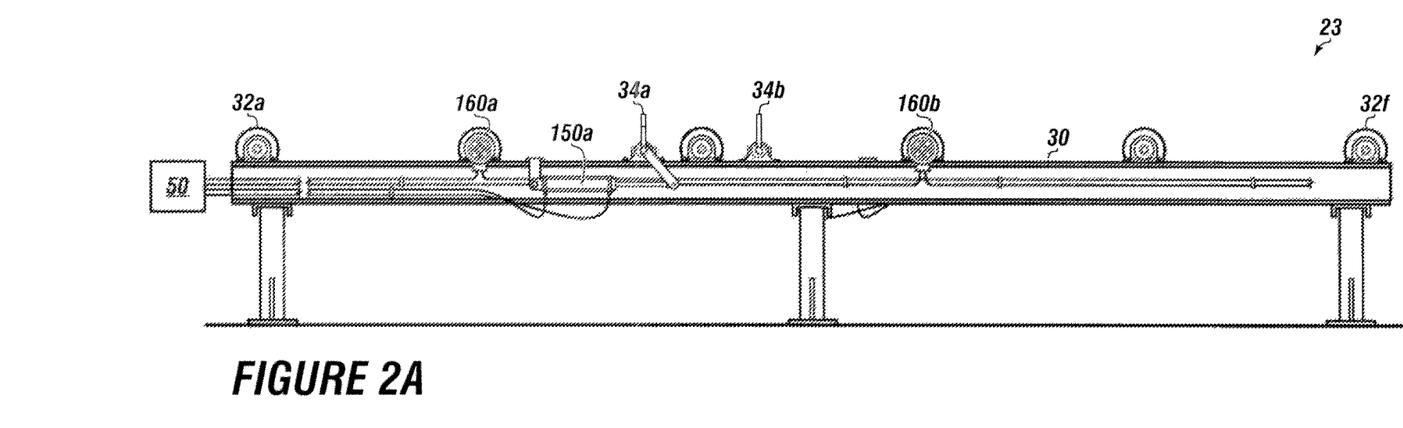
FIGS. 2A-2B depict a control module according to one or more embodiments.
Figure 2B:
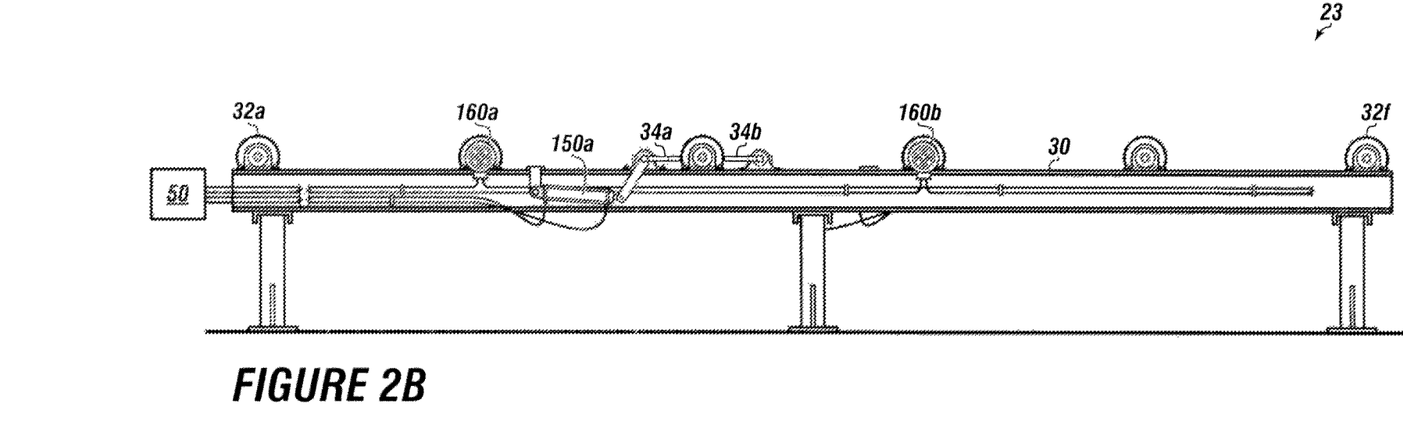

FIG. 2A-2B depicts a control module according to one or more embodiments.

The pipe conveyor 23 can have a control module 50, which can be connected to the plurality of motors 160a and 160b and the plurality of actuators 150a.

The pipe conveyor 23 is shown with the plurality of rollers 32a-32f, the plurality of movable inclined stops 34a and 34b and the frame 30.

Figure 3:
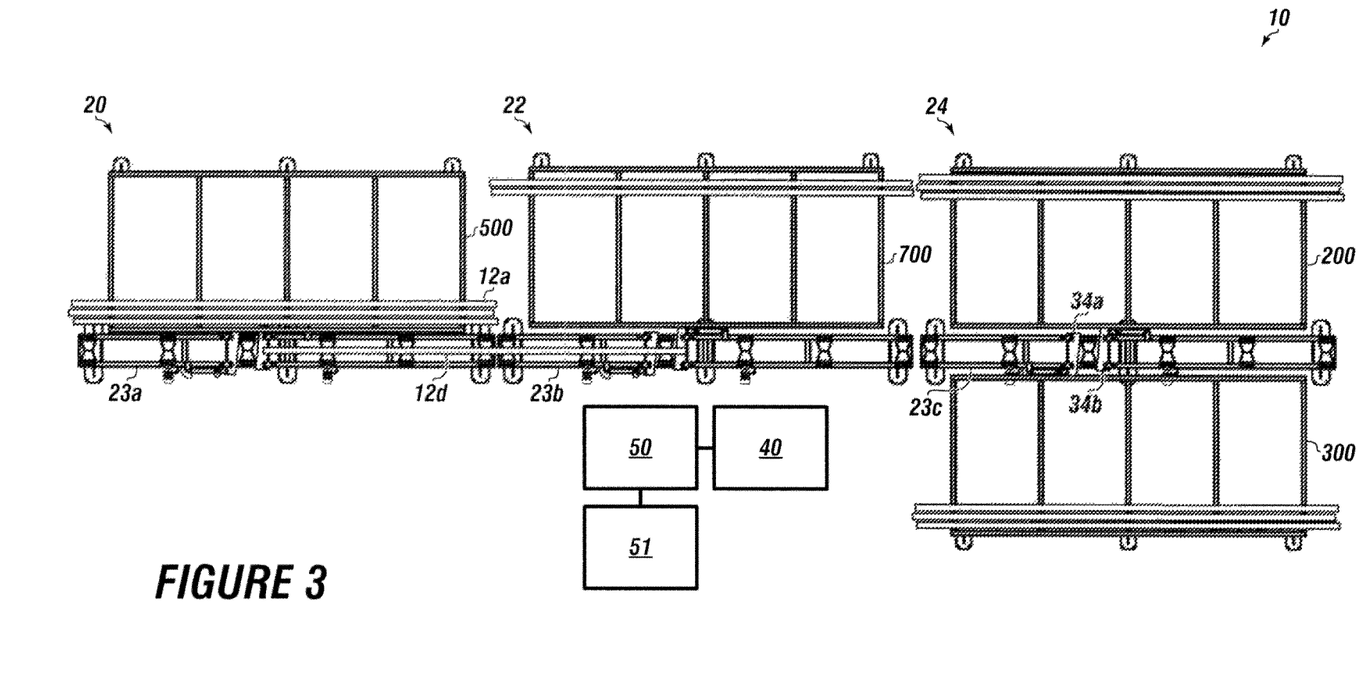
FIG. 3 depicts an automated modular quality control center assembly with connected modules according to one or more embodiments.

FIG. 3 depicts an automated modular quality control center assembly with connected modules according to one or more embodiments.

In embodiments, connected modules of the assembly, such as an automated inlet module 20, an automated transfer module 22, which can be connected to the automated inlet module 20, and an automated parameter defined segregation module 24, which can be connected to the automated transfer module 22 can be used with the automated modular quality control center assembly 10. In embodiments, the connected modules can each have a pipe conveyor.

The automated modular quality control center assembly 10 is shown with an automated inlet module 20, wherein the automated inlet module can have an initial pipe rack 500 for holding tubulars 12a-12d.

The automated inlet module 20 can have at least one pipe conveyor 23a for receiving tubulars 12a-12d from the initial pipe rack 500.

In embodiments, the automated transfer module 22 can be connected to the automated inlet module 20. The automated transfer module 22 can have at least one pipe conveyor 23b for receiving tubulars 12a-12d from the at least one pipe conveyor 23a of the automated inlet module 20.

The automated transfer module 22 can have a survey instrument detector 40 connected to a power supply 51. The survey instrument detector 40 can be mounted proximate the frame enabling tubulars 12a-12d on at least one pipe conveyor 23b of the automated transfer module to pass in close proximity to the survey instrument detector 40 for scanning by the survey instrument detector 40.

In embodiments, the survey instrument detector 40 can be at least one of: a gamma ray detector, a beta particle detector, and alpha particle detector. The gamma ray detector can transmit signals and a control processor can calculate detected radiation and present a signal from at least 1 micro roentgen and up to 500 micro roentgens on a display.

In embodiments, the automated transfer module 22 can include a control module 50, which can be connected to the survey instrument detector 40 and to the power supply 51.

In embodiments, the power supply 51 can be an onboard power supply mounted in the control module with a capacity of up to 480 volts of three phase current.

In embodiments, the automated transfer module 22 can include a reject pipe rack 700, which can be connected to the at least one pipe conveyor 23b of the automated transfer module.

In embodiments, the automated parameter defined segregation module 24 can be connected to the automated transfer module 22. The automated parameter defined segregation module 24 can have at least one pipe conveyor 23c for receiving tubulars 12a-12d from the at least one pipe conveyor 23b of the automated transfer module.

The automated parameter defined segregation module 24 can have a pass test exit pipe rack 200 to receive tubulars 12a-12d from at least one pipe conveyor 23c of the automated parameter defined segregation module that pass a preset survey instrument limit of the survey instrument detector 40 and a fail test exit pipe rack 300 to receive tubulars 12a-12d from at least one pipe conveyor 23c of the automated parameter defined segregation module that do not pass a preset survey instrument limit of the survey instrument detector 40.

Figure 4:
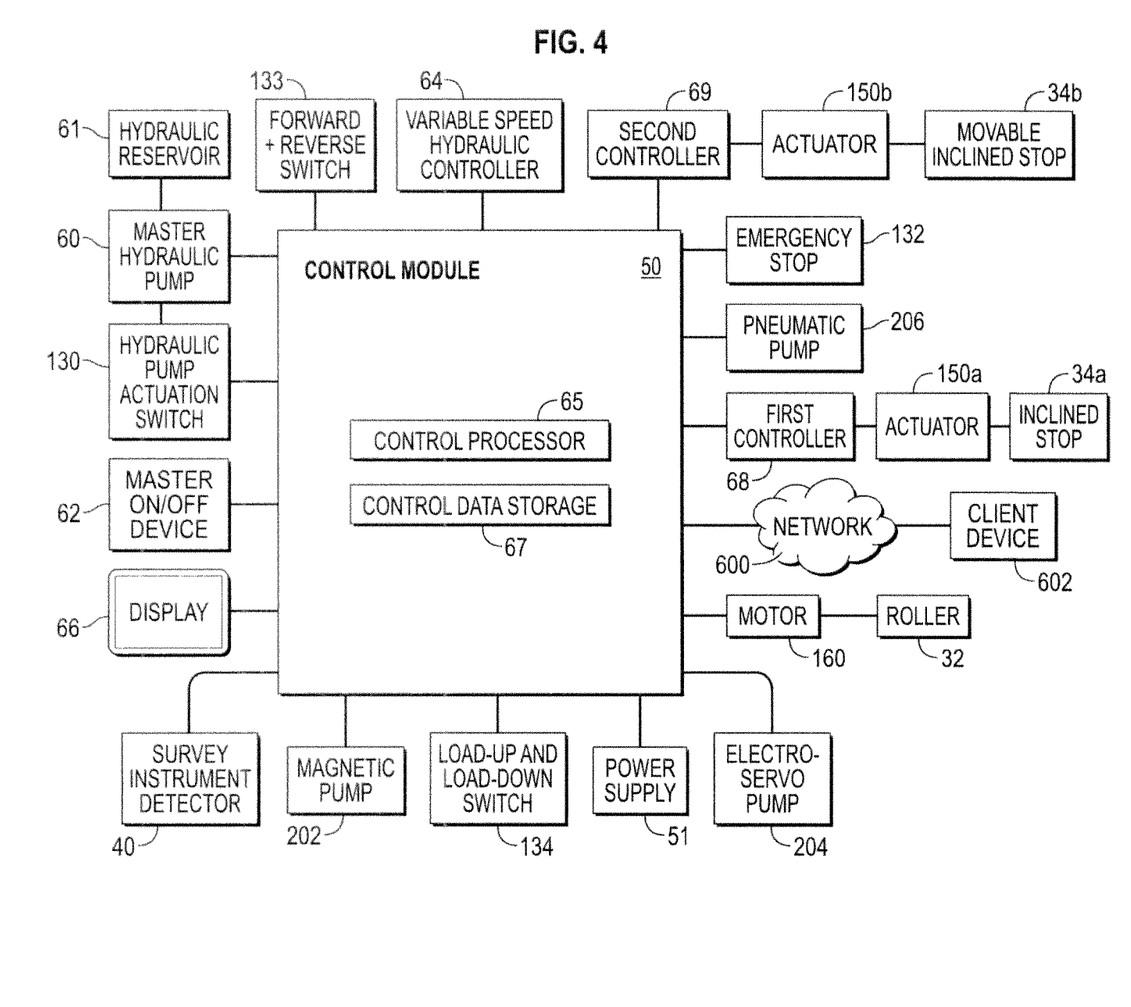
FIG. 4 depicts a diagram of a control module according to one or more embodiments.

FIG. 4 depicts a diagram of a control module according to one or more embodiments.

In embodiments, the control module 50 can have a master hydraulic pump 60 in communication with a hydraulic reservoir 61. The master hydraulic pump 60 can fluidly connect to at least one of the actuators 150a-150b and at least one or the motors 160.

In embodiments, a control processor 65 in can be in communication with a control data storage 67. The control processor 65 can be configured to receive data from the survey instrument detector 40 and compare received data to known standards in the data storage to pass or fail tubulars scanned by the survey instrument detector 40 forming compared data.

In embodiments, a master on/off device 62 can be connected to the master hydraulic pump 60 and the control processor 65.

In embodiments, a variable speed hydraulic controller 64 can be connected to the control processor 65, the master hydraulic pump 60, and the plurality of rollers 32 to change the speed of a tubular on the plurality of rollers 32. The variable speed hydraulic controller 64 can be configured to move tubulars longitudinally on the frame at a rate from 0.1 feet per minute to 60 feet per minute.

In embodiments, a display 66 can be in communication with the control processor 65 for presenting the compared data.

In embodiments, a first controller 68 can be in communication with the control processor 65 for operating all movable inclined stops 34a-34b mounted on a first side of the frame based on a set of rules for pass/fail stored in the control data storage 67.

Also, a second controller 69 can be in communication with the control processor 65 for operating all movable inclined stops on a second side of the frame opposite the first side of the frame based on the set of rule for pass/fail stored in the control data storage 67.

In embodiments, the control module 50 can have a hydraulic pump actuation switch 130 and an emergency stop 132 connected to the control processor 65.

In embodiments, the control module 50 can have a forward and reverse switch 133 for the at least one inlet module pipe conveyor, automated transfer module pipe conveyor, and automated parameter defined segregation module pipe conveyor connected to the control processor 65.

In embodiments, the control module 50 can have a load auto up and down switch 134 connected to the control processor 65.

In embodiments, the control module can have a magnetic pump 202.

In embodiments, the control module can have an electro-servo pump 204.

In embodiments, the control module can have a pneumatic pump 206.

In embodiments, the control module 50 can be connected to a network 600 for communication with a client device 602. The network 600 can be at least one of: a cellular network, a local area network, a SCADA network, a wide area network, a microwave network, a satellite network, a fiber optic network, any known network in the industry, or combinations thereof.

Figure 5:
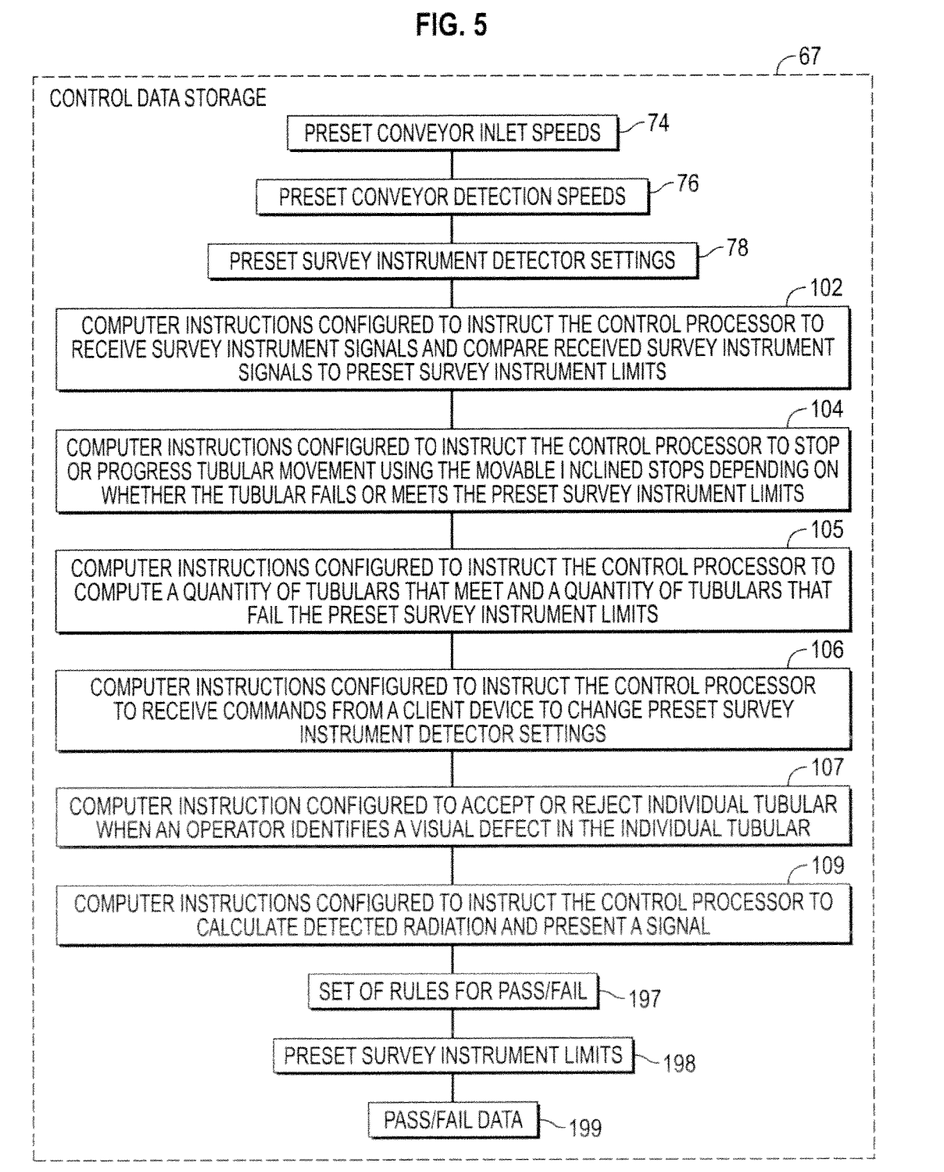
FIG. 5 depicts a data storage of the control module according to one or more embodiments.

FIG. 5 depicts a data storage of the control module according to one or more embodiments.

In embodiments, the control data storage 67 can contain preset conveyor inlet speeds 74, preset conveyor detection speeds 76, preset survey instrument limits 78, a set of rules for pass/fail 197, preset survey instrument limits 198, and pass fail data 199.

The control data storage 67 can contain computer instructions 102 configured to instruct the control processor to receive survey instrument signals and compare received survey instrument signals to preset survey instrument limits.

The control data storage 67 can contain computer instructions 104 configured to instruct the control processor to stop or progress tubular movement using the movable inclined stops depending on whether the tubular fails or meets the preset survey instrument limits.

The control data storage 67 can contain computer instructions computer instructions 105 configured to instruct the control processor to compute a quantity of tubulars that meet and a quantity of tubulars that fail the preset survey limits by a unit of time.

The control data storage 67 can contain computer instructions 106 configured to instruct the control processor to receive signals from a client device to change preset survey instrument detector settings.

The control data storage 67 can contain computer instructions 107 configured to instruct the control processor to accept or reject an individual tubular when an operator identifies a visual defect in the individual tubular.

The control data storage 67 can contain computer instructions 109 configured to instruct the control processor to calculate a detected radiation and presents a signal.

As an example the automated modular quality control center assembly has three modules for indexing, scanning and segregating tubulars automatically.

The first module can be an automated inlet module with an initial pipe rack that can hold a variety of lengths of tubulars ranging from 15 to 35 feet in length. Initially, the tubulars are indexed one at a time onto the pipe conveyor.

In this embodiment, the pipe conveyor has a frame constructed from tubulars or angular steel members. The pipe frame is constructed to hold 1 tubular indexed at a time using three rollers to cradle each tubular as the tubular moves linearly along the axis of the frame. In this example, the three rollers are geometrically mounted to self center each tubular. The rollers can be made from polyethylene. In this embodiment, the rollers are positioned along frame supporting the pipe along a center line without deforming.

A separate motor drives each the three rollers. The motors are secured to the frame and controller by a control module. The motors receive power from a power supply that is switchable between grid power and onboard power.

In this embodiment, two movable inclined stops are mounted to the frame, in such a fashion, each joint of pipe can be indexed in a linear fashion along the axis of the pipe rack. A plurality of actuators are mounted to the frame, each actuator operates a moveable inclined stop and is connected to the control module.

An automated transfer module is connected to the automated inlet module.

The automated transfer module has at least one pipe conveyor for receiving the tubulars from the at least one pipe conveyor such as at 30 feet per minute from the automated inlet module.

A survey instrument detector such as a gamma ray detector is connected to the power supply. The survey instrument detector is mounted proximate the pipe conveyor, such as ½ inch from the pipe enabling each individual tubular on the pipe conveyor to pass in close proximity to the survey instrument detector for scanning of gamma ray contamination by the survey instrument detector.

A control module such as a programmable LUDLUM™ Model 2214 is connected to the gamma ray detector and to the power supply as well as to each motor and each actuator to ensure uninterrupted scanning of the tubulars.

An automated parameter defined segregation module is connected to the automated transfer module. This module has three pipe conveyors for receiving the tubulars from the automated transfer module.

In this example, at least two post scan tubular pipe racks are used, so that one pipe rack receives scanned tubulars with a parameter, such as greater than 40 micro Roentgen per hour, and the other rack receives scanned tubulars with a parameter of less than 40 micro Roentgen per hour.

In another example, an automated modular quality control center assembly has an automated inlet module with an initial pipe rack holding 15 tubulars each 4.5 inches in diameter.

A pipe conveyor indexes each pipe joint, one at a time for receiving the tubulars from the initial pipe rack.

The pipe conveyor has a large steel frame with a plurality of rollers, namely six rollers, connected across the frame for centering and moving the tubular.

A motor moves each roller. Each motor is secured to the frame. Each motor is electrically connected to a power supply that is remote to the pipe conveyor.

Each pipe conveyor has several movable inclined stops mounted to the frame.

In this example, four moveable inclined stops are used with each movable inclined stop positioned to be geometrically offset from another moveable inclined stop.

Each moveable inclined stop is configured to raise a tubular a small amount, such as between ¼ inch and ½ inch enabling the tubular to roll off the at least one pipe conveyor.

An actuator actuates each moveable inclined stop.

The moveable inclined stop is connected to the controller which receives signals from a survey instrument detector positioned adjacent or in this case, mounted to the frame, and connected to the power supply.

In the example, the survey instrument detector is a laser that is mounted on the frame enabling each individual tubular of the plurality of indexed tubulars to be scanned by the survey instrument detector for specific properties, like scale density, scale chemical make up, and density of pitting.

A control module is connected to the survey instrument detector as well as to the power supply, which is a cord that engages an output from a power grid.

The control module is also connected to each motor and each actuator.

An automated parameter defined segregation module connects longitudinally to the automated transfer module so that indexed pipes from the automated transfer module are received in a sorted manner from the automated transfer module.

In this example, the automated parameter defined segregation module as three pipe conveyors for receiving the tubulars from the automated transfer module.

Part of the automated parameter defined segregation module is a pass test exit pipe rack to receive tubulars after being scanned by the survey instrument detector and moved by the control module that activates the rollers segregating tubulars that are within a preset survey instrument limit set by the controller using the survey instrument detector.

Part of the automated parameter defined segregation module is a fail test exit pipe rack to receive the tubulars after scanning tubulars that fail to fall within the preset survey instrument limit set by the controller using the survey instrument detector.

As a third example, the invention contemplates an automated modular quality control center assembly for scanning and sorting tubulars automatically that only uses two different modules.

In this embodiment, an automated transfer module is connected to the automated inlet module.

The automated transfer module has just one pipe conveyor for receiving the tubulars.

The automated transfer module also includes a survey instrument detector mounted to the frame of the pipe conveyor. The survey instrument detector is connected to the power supply. Each tubular passes adjacent to and is scanned by a survey instrument detector.

A control module that is a laptop computer is connected to the survey instrument detector via a wireless connection and is directly connected to both an onboard power supply and a cord that engages a power grid.

The control module operates each motor that runs a roller on the pipe conveyor and operates each actuator that operates each motor.

An automated parameter defined segregation module is directly connected to the automated transfer module in a removable detachable connection, which in this embodiment is a quick release.

The automated parameter defined segregation module has ten connected pipe conveyors for receiving the scanned tubulars from the automated transfer module.

The automated parameter defined segregation module has at least one post scan tubular pipe rack to receive scanned tubulars and priority group the scanned tubulars so that groups either match a survey instrument preset limit or fall outside the preset limit, or have another user defined parameter.

While these embodiments have been described with emphasis on the embodiments, it should be understood that within the scope of the appended claims, the embodiments might be practiced other than as specifically described herein.

What is claimed is:

1. An automated modular quality control center assembly 10 for tubulars 12a-12d comprising:
   a. an automated inlet module 20 comprising
   (i) an initial pipe rack 500 for the tubulars; and
   (ii) at least one pipe conveyor 23a for receiving the tubulars 12 from the initial pipe rack 500, each pipe conveyor comprising:
   1. a frame 30;
   2. a plurality of rollers 32 connected across the frame supporting the tubulars;
   3. a plurality of motors 160ab attached to the frame, each motor configured to rotate each roller, each motor connected to a power supply 51;
   4. a plurality of movable inclined stops 34ab mounted to the frame,
   5. a plurality of actuators 150ab mounted to the frame, each actuator operating each moveable inclined stop; wherein pairs of movable inclined stops individually index each tubular and convey indexed tubulars from the frame;
   b. an automated transfer module 22 connected to the automated inlet module 20, the automated transfer module 22 comprising: at least one pipe conveyor 23b for receiving the tubulars from the at least one pipe conveyor 23a of the automated inlet module;
   c. a survey instrument detector 40 connected to the power supply, the survey instrument detector mounted proximate the at least one pipe conveyor enabling each indexed tubular to pass in close proximity to the survey instrument detector for scanning; and
   d. a control module 50 connected to the survey instrument detector 40, the power supply 51, each motor, and each actuator, the control module configured to control a speed of each rollers to enable full scan to be performed by the survey instrument detector at a maximum speed wherein, wherein the control module comprises:
   (i) a hydraulic pump actuation switch 130 connected to the control processor;
   (ii) an emergency stop 132 connected to the control processor;
   (iii) a forward and reverse switch for each pipe conveyor of the automated inlet module, each pipe conveyor connected to the control processor; and
   (iv) a load auto up and load auto down switch 134 connected to the control processor for operating the plurality of movable inclined stops;

e. an automated parameter defined segregation module 24 connected to the automated transfer module 22, the automated parameter defined segregation module 24 comprising:
  (i) the at least one pipe conveyor 23c for receiving scanned tubulars from the automated transfer module; and
  (ii) at least one post scan tubular pipe rack to receive only the indexed and scanned tubulars that match a survey instrument preset limit.

2. The automated modular quality control center assembly of claim 1, wherein the control module comprises:
  a. a master hydraulic pump 60 in communication with a hydraulic reservoir 61, the master hydraulic pump fluidly connected to at least one of: the plurality of actuators and the plurality of motors for operating the plurality of motors and the plurality of actuators hydraulically;
  b. a control processor 65 in communication with a control data storage 67, the control processor 65 configured to receive signals with data from the survey instrument detector 40 and compare received data to preset survey instrument limits 198 in the control data storage to pass or fail tubulars as tubulars are moving past the survey instrument detector forming pass fail data 199 that is stored in the control data storage, the control data storage comprising
    (i) preset pipe conveyor inlet speeds 74;
    (ii) preset pipe conveyor detection speeds 76;
    (iii) preset survey instrument detector settings 78;
    (iv) computer instructions 102 configured to instruct the control processor to receive survey instrument signals and compare received survey instrument signals to the preset survey instrument limits 198; and
    (v) computer instructions 104 configured to instruct the control processor to stop or progress tubular movement using the plurality of movable inclined stops depending on whether a scanned tubular fails or meets the preset survey instrument limits 198;
    (vi) computer instructions 105 configured to instruct the control processor to compute a quantity of tubulars that meet and a quantity of tubulars that fail the preset survey limits by a unit of time; and
    (vii) computer instructions 106 to instruct the control processor to receive signals from a client device to change preset survey instrument detector settings 78;
  c. a master on/off device 62 connected to the master hydraulic pump 60 and the control processor 65;
  d. a variable speed hydraulic controller 64 connected to the control processor 65, the master hydraulic pump 60, and to the plurality of rollers 32 to change the speed that the tubulars are moving down the frame using the plurality of rollers;
  e. a display 66 in communication with the control processor 65 for presenting the pass fail data 199;
  f. a first controller 68 in communication with the control processor for operating the plurality of movable inclined stops mounted on a first side of the frame based on preset survey instrument limits 198 stored in the control data storage; and
  g. a second controller 69 in communication with the control processor for operating the plurality of movable inclined stops mounted on a second side of the frame opposite the first side based on preset survey instrument limits 198 stored in the control data storage.

3. The automated modular quality control center assembly of claim 1, wherein the pipe racks of the automated parameter defined segregation module comprise:
  a. a pass test exit pipe rack 200 to receive the tubulars from one of the pipe conveyors that passes a preset limit of the survey instrument detector; and
  b. a fail test exit pipe rack 300 to receive the tubulars from one of the pipe conveyors that do not pass the preset survey instrument limit of the survey instrument detector.

4. The automated modular quality control center assembly of claim 1, wherein the control module 50 is connected to a network 600 for communication with a client device 602 for remote control of the modular quality control center.

5. The automated modular quality control center assembly of claim 4, wherein the network 600 comprises at least one of: a cellular network, a local area network, a SCADA network, a wide area network, a microwave network, a satellite network, a fiber optic network or combinations thereof.

6. The automated modular quality control center assembly of claim 1, wherein the automated transfer module 22 comprises a reject pipe rack 700 connected to one of the pipe conveyors of the automated transfer module and further wherein the control data storage 67 comprises computer instructions 107 configured to instruct the control processor to accept or reject an individual tubular when an operator identifies a visual defect in the individual tubular.

7. The automated modular quality control center assembly of claim 1, wherein the power supply 51 comprises an onboard power supply mounted in the control module with a capacity of from 50 bolts to 480 volts of three-phase current.

8. The automated modular quality control center assembly of claim 2, wherein the variable speed hydraulic controller is configured to move the tubulars longitudinally on the frame at a rate from 0.1 feet per minute to 60 feet per minute.

9. The automated modular quality control center assembly of claim 1, wherein the survey instrument detector is at least one of: a gamma ray detector, a beta particle detector, and an alpha particle detector.

10. The automated modular quality control center assembly of claim 1, wherein the survey instrument detector is at least one of a laser, an ultrasonic detector, an electromagnetic detector, and a foreign material differentiator.

11. The automated modular quality control center assembly of claim 9, wherein the gamma ray detector transmits signals to the control processor and the control processor uses computer instructions a in the control data storage configured to instruct the control processor to calculate detected radiation and presents a signal from at least 1 micro Roentgen and up to 500 micro Roentgens on the display.

12. The automated modular quality control center assembly of claim 1, comprising eight movable inclined stops connected to the frame with four movable inclined stops mounted on one side of the frame and four movable inclined stops mounted on an opposite side of the frame.

13. The automated modular quality control center assembly of claim 1, wherein the motors are pneumatic motors, hydraulic motors, or combinations thereof.

14. The automated modular quality control center assembly of claim 1, wherein the actuators are pneumatic actuators, hydraulic actuators, or combinations thereof.

15. An automated modular quality control center assembly 10 for tubulars 12a-12d comprising:
  a. an automated inlet module 20, comprising:
    (i) an initial pipe rack 500 holding the tubulars; and (ii) at least one pipe conveyor 23a for receiving the tubulars 12 from the initial pipe rack 500, each pipe conveyor comprising:
1. a frame 30;
2. a plurality of rollers 32 connected across the frame;
3. a plurality of motors 160*ab*, each motor secured to one of the plurality rollers and to the frame 30, each motor connected to a power supply 51;
4. a plurality of movable inclined stops 34*ab* mounted to the frame to enable indexing of individual tubulars;
5. a plurality of actuators 150*ab* mounted to the frame connected to one of the plurality of moveable inclined stops; and b. a survey instrument detector 40 connected to the power supply and mounted proximate the frame configured to scan each tubular as each tubular moves on the at least one pipe conveyor;

c. a control module 50 connected to the survey instrument detector 40 and to (i) the power supply 51, (ii) each motor of the plurality of motors; and (iii) each actuator or the plurality of actuators, wherein the control module comprises:
(i) a hydraulic pump actuation switch 130 connected to the control processor;
(ii) an emergency stop 132 connected to the control processor;
(iii) a forward and ers switch for each pipe conveyor of the automated inlet module, each pipe conveyor connected to the control processor; and
(iv) a load auto up and load auto down switch 134 connected to the control processor for operating the plurality of movable inclined stops;

d. an automated parameter defined segregation module 24 removably connected to the automated transfer module 22, the automated parameter defined segregation module 24 comprising:
(i) at least one pipe conveyor 23c for receiving the tubulars from the automated transfer module;
(ii) a pass test exit pipe rack 200 to receive the tubulars from the automated transfer module that are within a preset survey instrument limit of the survey instrument detector; and
(iii) a fail test exit pipe rack 300 to receive the tubulars from the automated transfer module that are outside the preset survey instrument limit of the survey instrument detector; and e. a control processor 65 in communication with a control data storage 67, the control processor 65 configured to receive signals with data from the survey instrument detector 40 and compare received data to preset survey instrument limits 198 in the control data storage to pass or fail the tubulars as the tubulars are moving past the survey instrument detector forming pass fail data 199 that is stored in the control data storage, the control data storage comprising:
(i) preset pipe conveyor inlet speeds 74;
(ii) preset pipe conveyor detection speeds 76;
(iii) preset survey instrument detector settings 78;
(iv) computer instructions 102 configured to instruct the control processor to receive survey instrument signals and compare received survey instrument signals to the preset survey instrument limits 198; and
(v) computer instructions 104 configured to instruct the control processor to stop or progress tubular movement using the plurality of movable inclined stops depending on whether a scanned tubular fails or meets the preset survey instrument limits 198;
(vi) computer instructions 105 configured to instruct the control processor to compute a quantity of tubulars that meet and a quantity of tubulars that fail the preset survey limits by a unit of time; and
(vii) computer instructions 106 to instruct the control processor to receive signals from a client device to change preset survey instrument detector settings 78.

16. The automated modular quality control center assembly of claim 15, wherein the control module comprises:
a. a master hydraulic pump 60 in communication with a hydraulic reservoir 61, the master hydraulic pump fluidly connected to at least one of: the plurality of actuators and the plurality of motors for operating the plurality of motors and the plurality of actuators hydraulically;
b. a master on/off device 62 connected to the master hydraulic pump 60 and the control processor 65;
c. a variable speed hydraulic controller 64 connected to the control processor 65, the master hydraulic pump 60, and to the plurality of rollers 32 to change a speed that the tubulars are moving down the frame using the plurality of rollers;
d. a display 66 in communication with the control processor 65 for presenting the pass fail data 199;
e. a first controller 68 in communication with the control processor for operating the plurality of movable inclined stops mounted on a first side of the frame based on preset survey instrument limits 198 stored in the control data storage; and
f. a second controller 69 in communication with the control processor for operating the plurality of movable inclined stops mounted on a second side of the frame opposite the first side based on preset survey instrument limits 198 stored in the control data storage.

17. An automated modular quality control center assembly 10 for tubulars 12a-12d comprising:
a. an automated transfer module 22 connected to the automated inlet module 20, the automated transfer module 22 comprising: at least one pipe conveyor 23b for receiving the tubulars;
b. a survey instrument detector 40 connected to a power supply, the survey instrument detector mounted proximate a frame enabling each tubular on the at least one pipe conveyor to be scanned by the survey instrument detector;
c. a control module 50 connected to (i) the survey instrument detector 40, (ii) the power supply 51, (iii) at least one motor, and (iv) at least one actuator, wherein the control module comprises:
(i) a hydraulic pump actuation switch 130 connected to the control processor;
(ii) an emergency stop 132 connected to the control processor;
(iii) a forward and reverse switch for each pipe conveyor of the automated inlet module, each pipe conveyor connected to control processor; and
(iv) a load auto up and load auto down switch 134 connected to the control processor for operating the plurality of movable inclined stops;
d. an automated parameter defined segregation module 24 connected to the automated transfer module 22, the automated parameter defined segregation module 24 comprising: at least one pipe conveyor 23c for receiving the tubulars from the automated transfer module;

e. at least one post scan tubular pipe rack to receive scanned tubulars that match a survey instrument preset limit; and f. a control processor 65 in communication with a control data storage 67, the control processor 65 configured to receive signals with data from the survey instrument detector 40 and compare received data to preset survey instrument limits 198 in the control data storage to pass or fail the tubulars as the tubulars are moving past the survey instrument detector forming pass fail data 199 that is stored in the control data storage, the control data storage comprising:

(i) preset pipe conveyor inlet speeds 74;

(ii) preset pipe conveyor detection speeds 76;

(iii) preset survey instrument detector settings 78;

(iv) computer instructions 102 configured to instruct the control processor to receive survey instrument signals and compare received survey instrument signals to the preset survey instrument limits 198; and (v) computer instructions 104 configured to instruct the control processor to stop or progress tubular movement using the plurality of movable inclined stops depending on whether a scanned tubular fails or meets the preset survey instrument limits 198;

(vi) computer instructions 105 configured to instruct the control processor to compute a quantity of tubulars that meet and a quantity of tubulars that fail the preset survey limits by a unit of time; and (vii) computer instructions 106 to instruct the control processor to receive signals from a client device to change preset survey instrument detector settings 78.

\* \* \* \* \*